Oct. 30, 1934. E. C. MOGFORD ET AL 1,978,685
METHOD OF MAKING REAR AXLE HOUSINGS
Original Filed June 16, 1930 5 Sheets-Sheet 1
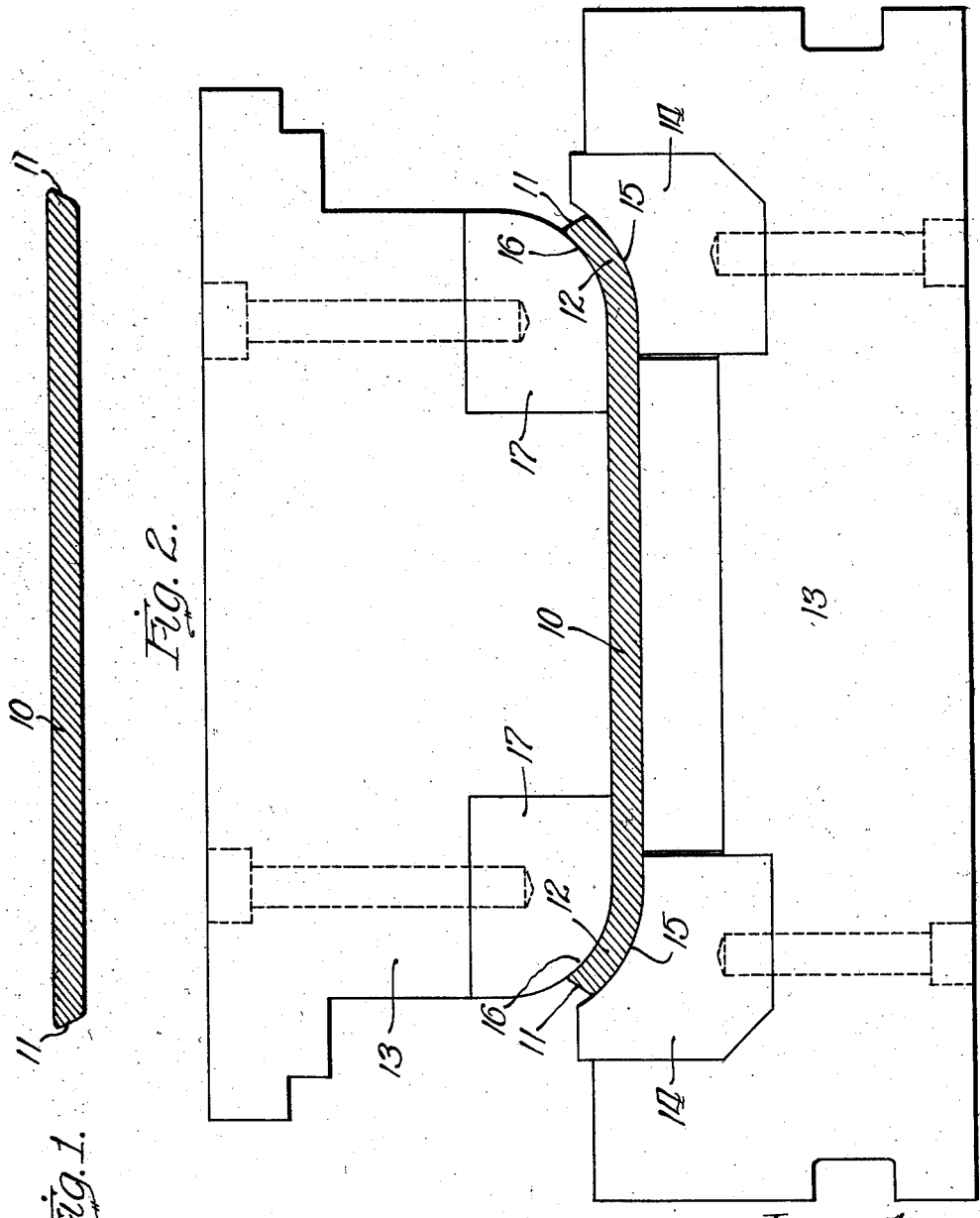
Inventors:
Edmund C. Mogford
George Spatta
By: [signature] Attys.

Oct. 30, 1934.  E. C. MOGFORD ET AL  1,978,685

METHOD OF MAKING REAR AXLE HOUSINGS

Original Filed June 16, 1930   5 Sheets-Sheet 2

Inventors:
Edmund C. Mogford
George Spatta
By: [signature]
Attys.

Oct. 30, 1934.　　E. C. MOGFORD ET AL　　1,978,685
METHOD OF MAKING REAR AXLE HOUSINGS
Original Filed June 16, 1930　　5 Sheets-Sheet 3

Inventors:
Edmund C. Mogford
George Spatta

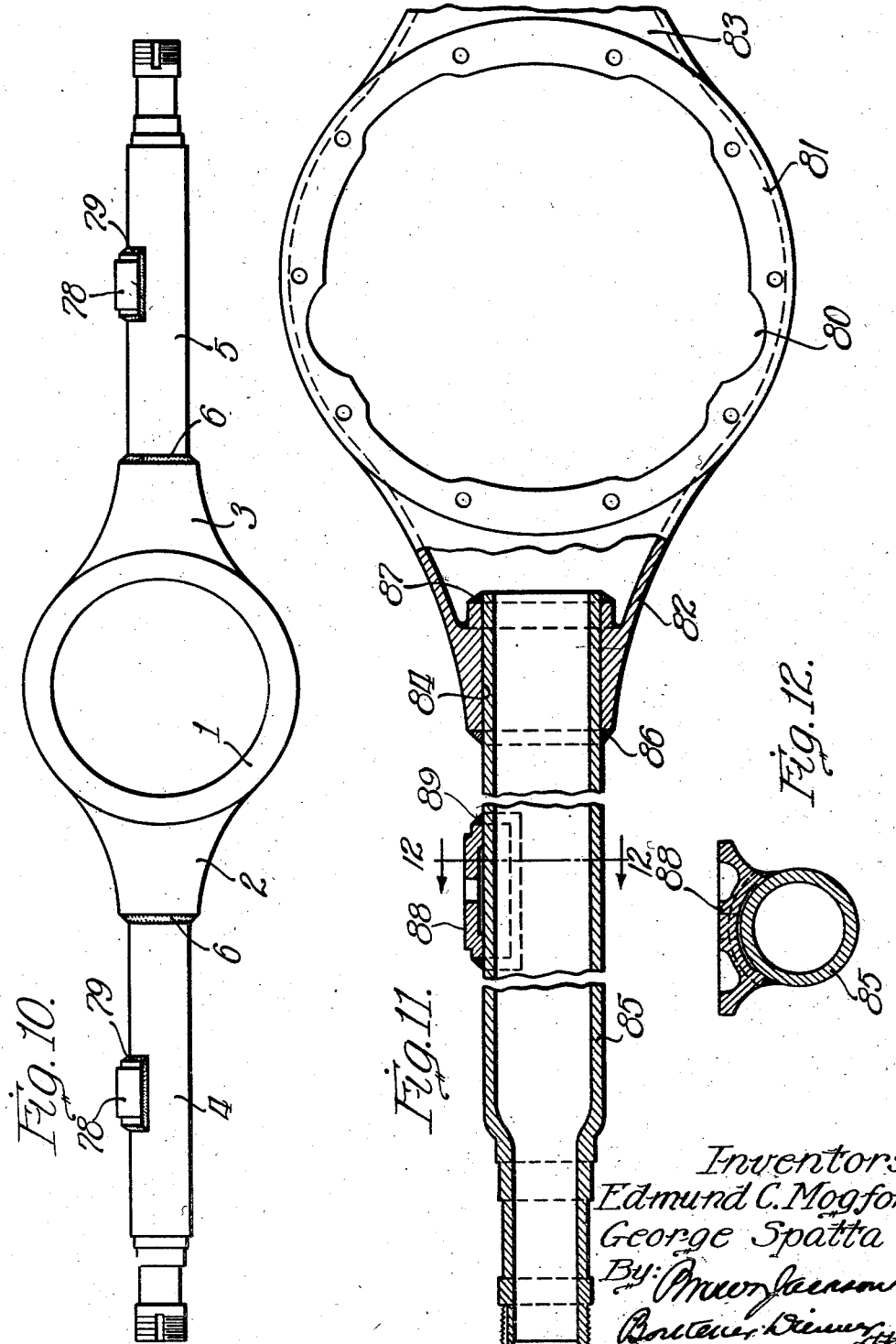

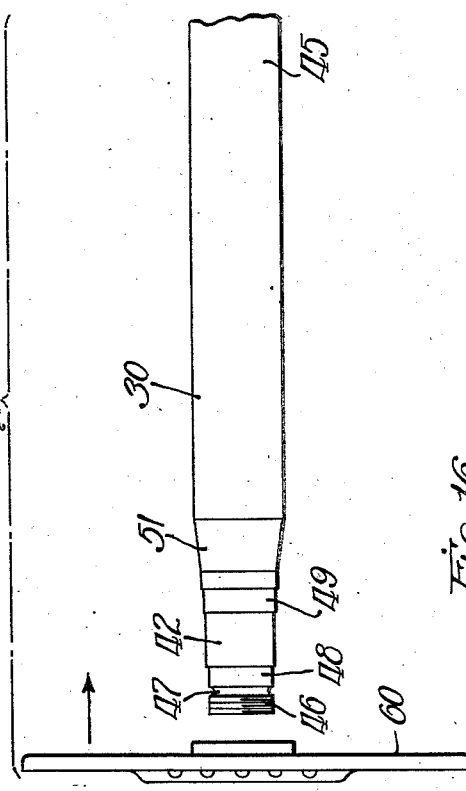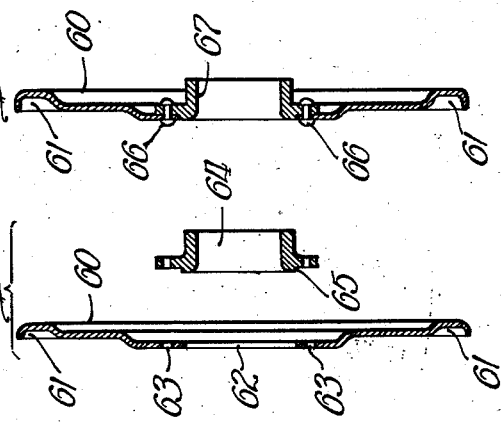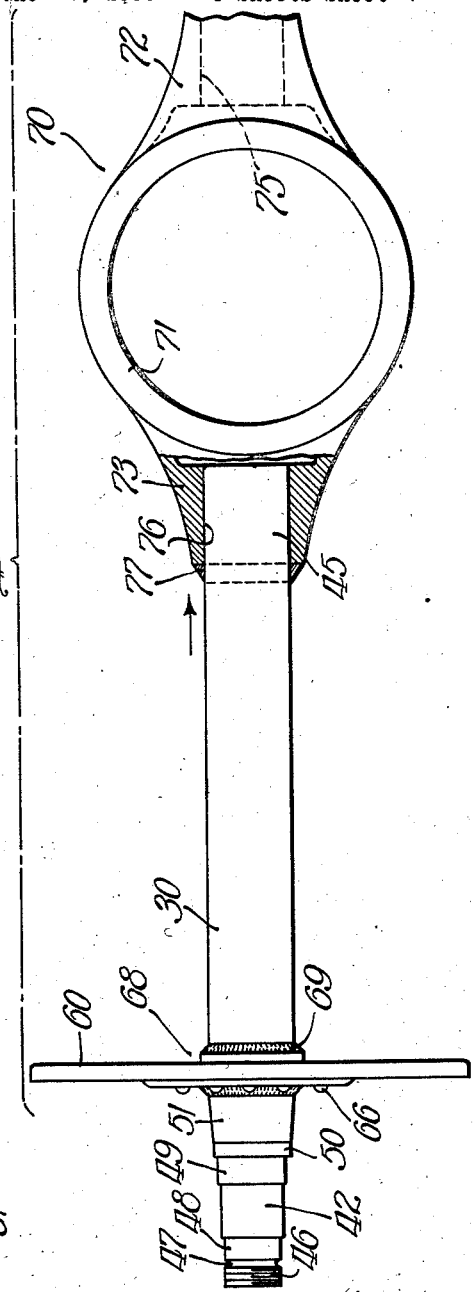

Patented Oct. 30, 1934

1,978,685

UNITED STATES PATENT OFFICE 1,978,685

METHOD OF MAKING REAR AXLE HOUSINGS

Edmund C. Mogford and George Spatta, Buchanan, Mich., assignors to Clark Equipment Company, Buchanan, Mich., a corporation of Michigan Original application June 16, 1930, Serial No. 461,392. Divided and this application July 20, 1931, Serial No. 551,879

4 Claims. (Cl. 29—153.1)

Our invention relates to a method of making rear axle housings.

Our present invention is concerned with the method of making rear axle housings of larger and heavier dimensions, such as would be used on motor buses, motor trucks, and the like. The axle housing per se, produced by the method herein disclosed, is disclosed in our Patent No. 1,955,824, dated April 24, 1934, of which the present application is a division.

In buses, motor trucks, and the like, it is customary to provide a full floating rear axle in which the weight of the vehicle is carried from the wheel through the bearings directly to the axle housing, and the driving spindles are extended through this housing free of any support in it. Axle housings of this type are old in the art. Such housings have generally been made of a casting, with the result that the housing is unduly heavy.

According to the present invention, we make up a separate differential housing, often termed a "banjo frame", which is designed to receive the differential gear. This differential housing banjo frame is made as a separate member, preferably by casting, although any equivalent means for making up a suitable part of this character may be employed. This banjo frame is provided of the proper configuration and wall thickness to serve its function as a support for the differential gear and connected parts, and is provided at opposite sides with hollow bosses which form sockets for receiving arms adapted to house the driving spindles. The arms are manufactured separately and then joined to the axle housing banjo frame, preferably by a press fit. This method of manufacturing separately the axle arms and the central banjo housing frame is highly advantageous for a number of reasons, first of which is the ease and uniformity of manufacture. It is more difficult to make a complete axle housing from end to end of a single casting. It is difficult and expensive to make a large thin walled casting. More expensive equipment is required, and cast metal is not particularly suitable for the stresses to which the arms are subjected. It is easier to handle a small casting and to manufacture the arms separately than to produce and machine the entire axle housing in one piece. The stress and vibration to which the housing is subjected is a maximum at the ends, since the wheels and the springs there support the load of the vehicle, and cast metal at this point is not well adapted for the service required. The ends of the arms are forged to reduce their diameter and to increase the wall thickness at the critical point where the stresses are greatest. This composite axle is therefore highly advantageous both for its ease and certainty of manufacture and for the resulting structural advantages which it possesses in use.

The axle collar or arms are formed separately, by cutting a suitable stock to the required length, and then gathering the walls of it in section by a series of endwise upsetting forging operations. The stock from which the arms are made may be either a piece of seamless steel tubing of suitable wall thickness, or a piece of flat steel plate, such as boiler plate for example, which is blanked to shape and formed as a cylinder by a series of forming operations prior to the operation of gathering and thickening it in section. When made of a sheet of boiler plate or the like, the edges of that sheet are beveled so that when abutted in the seam of the cylinder, they form a V-shaped groove which may be closed by the metal used in welding the abutting edges together.

The axle arms thus formed are machined accurately to size and pressed into the cylindrical sockets of the differential housing, and the axle is then finished by pressing a brake shoe plate or disc over the free end of the axle housing and attaching it in place in any preferred manner such as by welding. Spring seat pads formed as castings or forgings or sheet metal stampings are then attached to the axle housing in any preferred manner, as by welding.

The method lends itself well to the fabrication of axle housings in quantity production. The axle housing thus produced is of a symmetrical and pleasing appearance, is light in weight, and can be manufactured economically.

The steps of our improved process will be best understood by reference to the accompanying drawings in which they are diagrammatically illustrated, and in which:

Figure 1 is a cross sectional view of a sheet of stock from which the tubular axle housing is made;

Figure 2 is a fragmentary elevational view of the dies which may be employed in the first step of forming this stock;

Figure 10 is an elevational view of a completely assembled housing;

Figure 11 is a fragmentary cross sectional view drawn to an enlarged scale showing the details of construction of the axle shown in Figure 10;

Figure 12 is a cross sectional view taken along the line 12—12 of Figure 11 looking in the direction of the arrows;

Figure 13 is an exploded cross sectional view of the brake shoe drum and flange;

Figure 14 is a similar view of the brake shoe drum and flange assembled;

Figure 15 is a fragmentary exploded view of the brake drum flange and axle housing; and Figure 16 is an assembly view, partly in section, of a somewhat modified form of axle and showing the application of the brake shoe drum to it.

Figure 4:
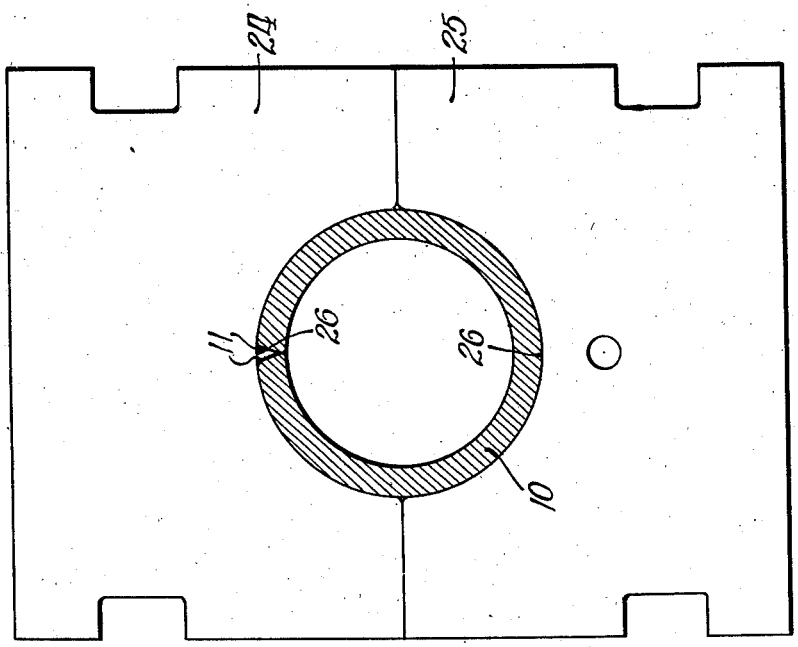
Figure 4 is an end elevational view of the dies employed in the final stage of forming this stock into a tubular blank.

Referring now to the drawings in more detail, the axle housing made by our improved process comprises a differential casing or banjo frame 1 having projecting bosses 2 and 3 defining sockets into which axle arms 4 and 5 are accurately fitted and attached in any preferred manner, as by welds indicated at 6. The details of construction of the housing per se will be found in our co-pending application Patent No. 1,955,824, dated April 24, 1934, of which the instant application is a division.

The axle arms 4 and 5 may be made in a number of different ways within the teachings of our invention. As will be seen in Figures 1 to 4 inclusive, these arms may be made from a piece of flat stock 10 which has beveled edges 11 and which is first formed by upturning the metal 12 adjacent these bevels 11 by the operation of a pair of cooperative dies 13 which are pressed together by a suitable press, with the stock 10 therebetween. The details of construction of these dies 13 are not of the essence of the present invention, it being sufficient to note that they are provided with hardened forming blocks 14 carried by the stationary die and upon which the stock 10 is rested when inserted in the machine. These blocks 14 have arcuate faces 15 against which the stock 10 is forced by faces 16 of the companion forming blocks 17 carried by the die.

Figure 3:
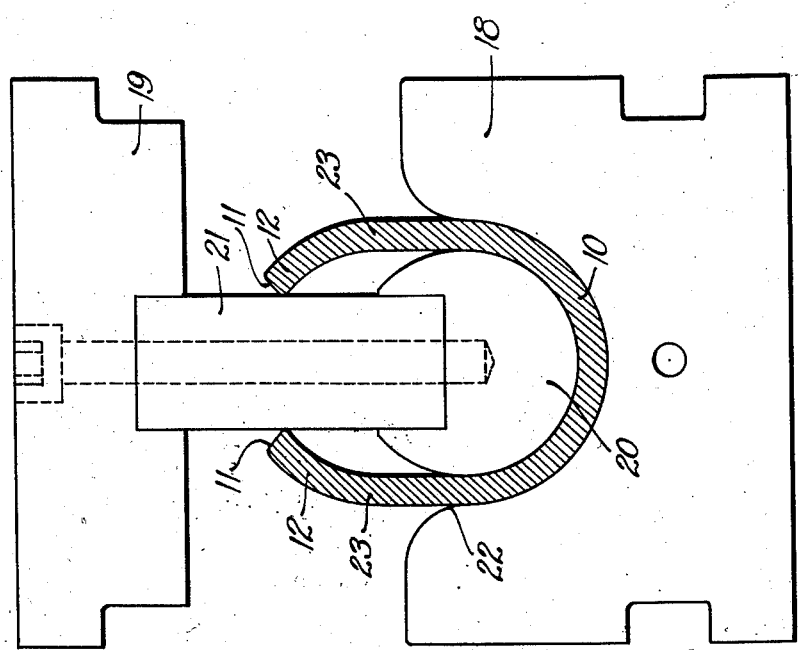
Figure 3 is an end elevational view of the dies employed in the second step of forming this stock.

The blank thus formed is next formed into a general U-shaped configuration by a suitable punch and die, as shown in Figure 3 and comprising a stationary die 18 across which the blank 10 is laid with its upturned edges uppermost. The movable punch or die 19 carries a generally cylindrical forming block 20 separated from the main body of the die by a spacing block 21, this block 20 cooperating with a recessed portion 22 in the stationary die to form the work into the U-shaped configuration shown. The edges of the bevel portion 11 of the work abut against the spacing block 21 and are held thereby at a fixed distance from each other. After the die 19 has thus been nested into the stationary die 18, it is withdrawn, and the work removed from it by sliding it endwise off of the blocks 20 and 21. It will be noted that the side walls 23 of the work are substantially straight and that the closed end is semi-circular in section.

The tubular blank is completed by the action of dies 24 and 25 each of which contains semi-circular forming faces 26 which are closed together to form a circle when the dies are closed. The work 10 is fitted into the stationary die 25 and projects upward therefrom to be engaged by the movable die 24 as the latter is lowered into registration with the die 25. The action of these two dies forms the work into circular section and brings the beveled ends 11 of it into abutment, causing them to form a V-shaped slot running longitudinally of the work.

The cylinder thus formed is of uniform diameter and wall thickness, and may be completed by welding the V-shaped longitudinal groove in it. Because of the beveled edges of the stock from which the cylinder is made this groove is sufficiently wide at the top to permit it to be readily filled with molten metal by the welding process, and thus it is assured that the weld will extend entirely through the tube and that the abutting ends of the tube will be securely welded together. If desired, this welding operation may be performed prior to the performing of subsequent operations upon the cylinder, or if desired, the welding may be done after these operations are performed within the teachings of our invention.

Figure 5:
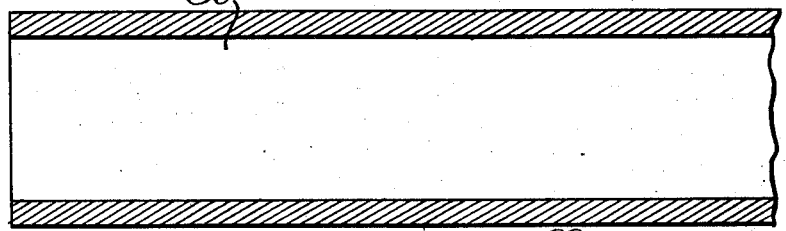
Figure 5 is a cross sectional view of the tubular blank.
Figure 6:
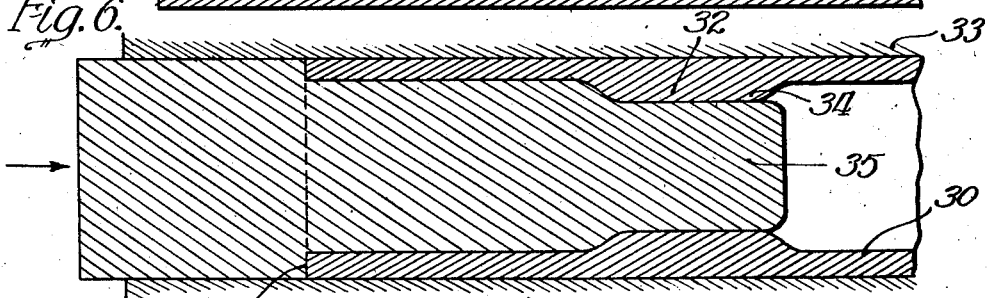
Figure 6 is a similar view taken at the end of the first step in the process of forging the blank.

The blank thus formed is next gathered at its end section to thicken its walls and to shape it as required for the formation of the bearing seat of the axle. The steps of our improved process beginning with the gathering of the metal in the blank are obviously the same regardless of whether the blank is made from seamless stock or from flat stock fabricated into cylindrical form in the hereinbefore mentioned manner. The blank 30, Figure 5, is heated locally as at 32, and then gripped in the die 33 of a suitable forming press and gathered as at 34 in any preferred manner such as by the insertion of a gathering ram 35 within it. This ram or punch 35 is shouldered as at 36 to engage the end of the blank and to force it longitudinally of itself to thereby gather metal as shown at 34. The inside diameter and shape of the gathered metal are controlled by the shape of the punch 35 in the usual manner. The outside diameter of the blank 30 is maintained unchanged by the gripping action of the clamp members 33 by which it is engaged. This operation of course shortens the length of the blank.

After the walls of the blank have been thus thickened it is allowed to cool, and then swedged by forcing an external collar over its end section 37 which moves the metal in that section inward to form a cylinder 38 which has a diameter somewhat smaller than the external diameter of the blank 30. As shown, the internal diameter of the cylinder 38 is substantially the same as the internal diameter of the metal gathered at 34; however, this particular detail may be varied within the teachings of our invention.

Any preferred form of swedging machine may be used for this operation, and preferably a suitable punch is inserted in the inside of the tube to maintain the cylindrical section 38 in alignment with the cylindrical section of the blank 30. This swedging operation of course lengthens the tube somewhat, and forms a shoulder 39 located adjacent the section 32 of the walls which have previously been thickened.

Figure 7:
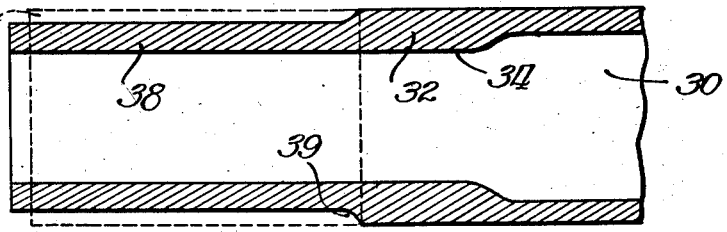
Figure 7 is a cross sectional view showing the first swedging operation performed upon the blank.
Figure 8:
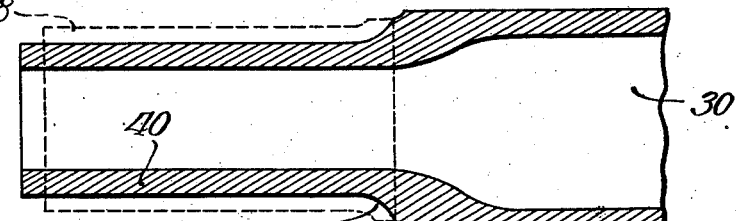
Figure 8 is a similar view showing the second swedging operation performed upon the blank.
Figure 9:
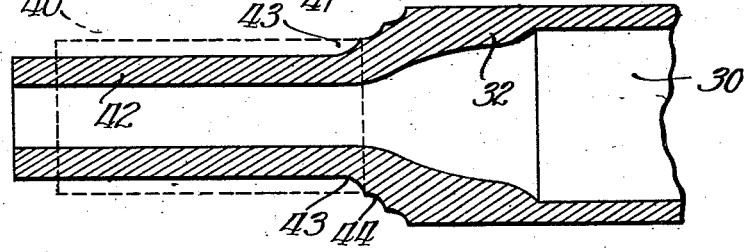
Figure 9 is a similar view showing the third and last swedging operation performed upon the blank.

Upon the completion of the first step in the swedging operation shown in Figure 7, a second and similar step is performed, moving the metal in the cylinder 38 radially inwardly to form a new cylinder 40 of smaller diameter and slightly greater length, this operation forming a shoulder 41 which is located farther from the end of the cylinder than the former shoulder 39, that is, the new shoulder 41 is formed nearer the center of the thick wall section 32.

A third and last swedging operation is next performed which operation moves the metal from the cylinder 40 inwardly to form a new cylinder 42 of smaller diameter and greater length, the operation forming a shoulder 43 located adjacent the shoulder 41 previously formed and located at the end of the thickened wall region 32.

Since the external surface of the blank must be subsequently machined to form seats for the bearings of the wheel and for the grease retaining devices, no effort is made during the swedging operations to form a smooth shoulder at the junction of the thick wall section 32 and the end cylinder 42 of the blank, and shoulders 39, 41 and 43 are all somewhat visible in the completed blank.

Preferably the swedging operations are all made with the blank cold, and by a hydraulic swedging machine, although if desired, hot swedging process may be substituted within the teachings of our invention. Further, the three steps enumerated by way of example may be increased or decreased as required.

The swedging operations tend to thicken the walls of the cylinder 42, this thickening supplying excess metal which is removed in the machining operation, with the result that the wall thickness of the end cylinder 42 in the finished housing is substantially the same as the wall thickness of the main part of the blank 30. Obviously by suitable design of the punch and swedging dies employed to form this cylinder 42 the walls of it can be thickened more or less as desired.

After the last swedging operation has been performed the blank is next machined in a suitable lathe which finishes the external surface of the main portion 30 of the blank into a perfect cylinder of a particular diameter, this diameter being held within close limits particularly at its end 45, Figure 16, which is to be subsequently joined with a differential casing. The end cylinder 42 is machined smooth, and a threaded portion 46, oil groove 47, bearing race seat 49, and oil retainer seat 50 are formed in it, all of these being held to rather close limits in accordance with established practice. The cylinder portion 42, which is of smaller diameter than the main portion 30 of the blank, is disposed with its axis in alignment with the axis of that portion, and is joined to the larger portion 30 by a frusto-conical section 51 the external surface of which is machined to an accurate taper. This machining operation completes the fabrication of the end housing cylinder.

The brake shoe plate or disc 60 is preferably a sheet metal stamping provided with a peripheral flange 61 and with a central opening 62 around which are formed a plurality of rivet holes 63. A flange collar 64 is cast or forged and a shoulder 65 machined on it, which shoulder registers accurately with the opening 62 in the brake shoe plate 60. The plate and flange are assembled and attached together in any preferred manner such as by rivets 66 or by welding.

The internal opening 67 of the flange collar 64 is machined accurately to size so that it will fit over the large portion of the arm 30 of the axle housing, preferably with a press fit. The brake shoe plate is pressed onto the axle arm 30 and accurately positioned thereon as shown at 68, where it is rigidly attached to the arm in any preferred manner such as by ring welds 69 and 70. If desired, the flange 24 may be riveted to the arm 30 or may be spot welded thereto within the teachings of our invention.

The attaching of the brake shoe disc to the arm 30 may take place either before or after the arm 30 is attached to the differential casing, and the time at which it is done will of course govern the arrangement used for clamping the arm during the operation of inserting its cylindrical end 45 into the socket of the differential casing.

As will be seen in Figures 10, 11 and 16, the differential casing 70 consists of a circular banjo 71 having cylindrical bosses 72 and 73 formed integral with it and disposed on diametrically opposite sides of it. This casing may be either a cast steel housing, or if desired, it may be formed from pressed metal, being formed in two sections which are attached together in any preferred manner such as by riveting or welding.

The interior surfaces 75 and 76 of the bosses 72 and 73 respectively are machined accurately to size to form a press fit with the accurately machined section 45 of the arm 30, and in the next step of the manufacture of the preferred embodiment of our invention the axle arm 30 is gripped in one of the elements of a suitable hydraulic press, and the differential casing 70 is gripped in the other jaw of that press and the two are pressed fitted together.

As will be apparent to those skilled in the art, the arms and the differential casing 70 can be joined with their axes accurately aligned with each other, so that in the completed unit the arms 30 project on a radius from the cylindrical section 71 of the differential casing 70.

If desired, an arm member 30 may be inserted in the socket in the boss 72 simultaneously with the insertion of a similar member in the socket in the boss 73, or these two units may be inserted separately within the teachings of our invention.

After the arm members have been pressed into the sockets in the bosses they are fastened in place in any preferred manner such as by ring weld 77 or by rivets, not shown, projecting through the walls of the bosses and the walls of the end 45 of the member 30. In certain instances, it may be advantageous to secure the arms in the differential casing by means of a spot weld formed by drilling through the walls of the boss 73 and arm 30 and then filling the drill hole with metal by welding. Regardless of the type of fastening employed to join these two units together, they must be securely fastened so that the arm 30 cannot rotate or move longitudinally with respect to the differential casing 70.

After the arm members have thus been secured in the differential member 70, spring pads 78 are attached to the arms in any preferred manner such as by welds 79. The spring pads may be pressed metal pads, forged metal pads, or if desired, may be sheet metal punchings and are preferably attached by ring welds on the opposite sides of the pads.

The axle housing thus completed is cleaned and painted in the usual manner and is in readiness to receive the driving spindles and differential members that are to be encased within it.

The preferred order of performance of various steps in the fabrication of our invention as enumerated hereinbefore can be varied within the teachings of it. Preferably the arm members 30 are machined immediately after they have been swedged and before they are pressed into the differential casing. Preferably the brake shoe plates are attached before the driving spindle housing arms are inserted in the differential casing. This preferred form of procedure eliminates the necessity of centering the axle housing a plurality of times, since when it is centered all of the machining that is to be done on it is accomplished in one operation. By machining the arms 30 prior to their insertion in the differential casing the necessity of swinging the entire assembly is eliminated. In certain instances, however, it may be advantageous to vary this precise order of steps and such variation is contemplated within the teachings of our invention.

In Figure 11 we have shown a somewhat modified form of axle housing made by the process hereinbefore pointed out. It will be noted that the differential casing is provided with a flanged circular opening 81 at the opposite sides of which are projected cylindrical bosses 82 and 83, each machined at 84 to receive the end of an axle housing. Boss 82 projects outwardly slightly farther than the boss hereinbefore described, and the driving spindle housing arm 85 is pressed into a socket in this boss slightly farther than in the previously described embodiment of our invention. This permits us to weld the arm 85 at two different points by ring welds 86 and 87, thereby producing a stronger joint between the two members without the necessity of resorting to rivets or spot welds. If desired, rivets or spot welds may of course be used within the embodiment of our invention. It will also be noted that the arm 85 is of somewhat different design than the arm 30 in the embodiment hereinbefore described. Attached to this arm 85 are spring pads 88 which are preferably forged pads attached by ring welds 89. The spring pads 88 are provided with a central opening 90 into which the bolt of the spring assembly is projected, the head of that bolt serving as a pin for preventing movement of the spring with respect to the pad 88.

While our improved method of forming a rear axle housing is described in connection with the formation of a full floating type of housing, obviously the method may be modified by forming flanges on the ends of the axle housing members in the manner set forth in the patent to George Spatta, No. 1,926,353, issued September 12, 1933, to thereby form a housing of the semi-floating type. We are not therefore to be limited to the precise details shown by way of example.

Having thus complied with the statutes, and shown and described a preferred embodiment of our invention, what we consider new and desire to have protected by Letters Patent is pointed out in the appended claims.

What is claimed is:

1. The method of forming a tubular rear axle housing comprising, upsetting a tubular blank to thicken its walls, swedging the blank to form a small diameter end section joined to the rest of the blank by a frusto-conical section, machining the blank to final shape and size to form an arm, forming a brake shoe plate having a central opening, forming a flanged collar, registering the flanged collar with the plate and attaching them together, forcing the collar over said arm and attaching it thereto, forming a differential casing having a pair of oppositely disposed cylindrical bosses, pressing said arm into one of the bosses and welding said arm to the boss at the two ends of that boss.

2. In an axle housing of the type having a differential casing and a pair of separately formed hollow arms secured thereto and extending therefrom, the method of forming one of the arms which comprises, heating a thin walled tubular blank, upsetting the wall by endwise pressure to produce a portion of increased thickness spaced from the end of the blank, reducing the outside diameter of the blank between the thickened portion and the end thereof, the juncture between the reduced end and the rest of the blank comprising the thickened portion, forming a bearing seat at the reduced diameter portion of the blank and adjacent the thickened portion, and securing a spring seat on the blank.

3. The method of forming an arm of a tubular axle housing which comprises, forming a metal tube, thickening the tube at a portion adjacent to but spaced from one end thereof by gathering metal on the inside of the tube to produce a portion of decreased internal diameter, forging the tube between the thickened part and the adjacent end to reduce the internal diameter to an amount less than the internal diameter of the tube at the thickened part, and to reduce the external diameter of the tube by a substantial amount, forcing metal at the thickened part radially inward as the internal diameter of the end of the tube is decreased, said thickened part joining the reduced diameter end portion of the tube with the rest of the tube, then forming a bearing seat on the reduced end portion of the tube.

4. The method of forming an axle housing which comprises, forming a banjo frame casing having relatively short aligned cylindrical sleeve portions projecting from opposite sides thereof, forming a pair of relatively long tubular arms, thickening each of the arms at a portion adjacent to but spaced from one end thereof by gathering metal on the inside of the tube to produce a portion of decreased internal diameter, forging the portion of each arm lying between the thickened part and the adjacent end to reduce the internal diameter to an amount less than the internal diameter at the thickened part and to decrease the external diameter a substantial amount, forcing the metal at the thickened part radially inwardly as the internal diameter of the ends of the arms is decreased, forming a bearing seat on the reduced end portions of the arms, press fitting the opposite ends of the tubular arms into said sleeve portions, and securing the press fitted arms in place in the banjo frame casing.

EDMUND C. MOGFORD.
GEORGE SPATTA.